US007719213B2

(12) United States Patent
Herman et al.

(10) Patent No.: US 7,719,213 B2
(45) Date of Patent: May 18, 2010

(54) DOOR ACTUATOR AND OPENER

(76) Inventors: Stephen A. Herman, 6518 W. Castle Pines Way, Tucson, AZ (US) 85757; Garrett J. Swank, 8101 N. 40th Ave., Phoenix, AZ (US) 85051; Estit S. Ramirez, 14944 N. 172nd La., Surprise, AZ (US) 85373

( * ) Notice: Subject to any disclaimer, the term of this patent is extended or adjusted under 35 U.S.C. 154(b) by 762 days.

(21) Appl. No.: 11/551,095

(22) Filed: Oct. 19, 2006

(65) Prior Publication Data

US 2008/0092443 A1 Apr. 24, 2008

(51) Int. Cl.
*G05D 1/02* (2006.01)

(52) U.S. Cl. ......................... 318/16; 49/25; 340/825.19

(58) Field of Classification Search ................... 318/16; 49/25; 340/825.19
See application file for complete search history.

(56) References Cited

U.S. PATENT DOCUMENTS

| | | | | |
|---|---|---|---|---|
| 5,898,397 | A * | 4/1999 | Murray | 341/176 |
| 5,936,544 | A * | 8/1999 | Gonzales et al. | 340/5.22 |
| 6,720,861 | B1 * | 4/2004 | Rodenbeck et al. | 340/5.64 |
| 6,842,692 | B2 | 1/2005 | Fehr et al. | |
| 6,956,495 | B2 * | 10/2005 | Klein et al. | 340/825.19 |
| 7,170,820 | B2 * | 1/2007 | Szajnowski | 367/127 |
| 7,391,319 | B1 * | 6/2008 | Walker | 340/536 |
| 2002/0183008 | A1 | 12/2002 | Menard et al. | |
| 2003/0197645 | A1 | 10/2003 | Ninomiya et al. | |
| 2004/0087317 | A1 | 5/2004 | Caci | |
| 2005/0190798 | A1 | 9/2005 | Chau et al. | |
| 2005/0246094 | A1 | 11/2005 | Moscatiello | |
| 2005/0285024 | A1 | 12/2005 | Eubelen | |

* cited by examiner

*Primary Examiner*—Bentsu Ro
*Assistant Examiner*—David S Luo
(74) *Attorney, Agent, or Firm*—Robert D. Atkins

(57) ABSTRACT

An actuating mechanism for a door includes a first antenna block having a first integrated microcontroller electrically connected to a first transceiver device and a first antenna. A second antenna block having a second integrated microcontroller is electrically connected to a second transceiver device and a second antenna. A processor device is electrically connected between the first and second microcontrollers and a first switch. The first and second antennas receive a first radio frequency signal from a third, mobile transceiver device. The processor device measures a time difference of arrival (TDOA) of the first radio frequency signal. The processor device computes a direction of arrival (DOA). The DOA measurement is compared against a predefined range of DOAs. The processor device sends a control signal to the first switch to actuate the door in the event of a match.

24 Claims, 7 Drawing Sheets

DOOR ACTUATOR AND OPENER

FIELD OF THE INVENTION

The present invention relates in general to automated mechanical systems and, more particularly, to an apparatus, system and method of remotely actuating a door.

BACKGROUND OF THE INVENTION

A certain percentage of every community includes individuals who have physical disabilities or are otherwise unable to perform many common and ordinarily routine physical tasks, such as opening a door. Implementation of the Americans with Disabilities Act (ADA) has resulted in greater access that individuals with physical disabilities have to the greater community at large. For example, the Act requires that accessible doors include a large push-button switch which a disabled person can press to actuate a door opener and open the door. The switch is usually located in close proximity to the door opening.

In many cases, however, certain individuals have difficulty physically reaching or depressing the switch to actuate the door. Some persons have disabilities associated with bodily extremities, for example, the inability to move arms or hands. The disabled persons who cannot depress the switch cannot gain access to a building without additional assistance.

A wide variety of remote door opening systems can be found in the art which use wireless and/or infrared communications schemes. Companies offer, for example, wireless door opening systems that use a remote control to open a door. However, the remote controls require a disabled user to depress a button (on the remote) each time the user approaches a door, which is again difficult for many persons with disabilities. In addition, the remote controls must be programmed by the user in order for the remotes to function with each door opening motor. The prospect of programming remote controls can be intimidating, inconvenient, and time consuming to a disabled user.

A particular remote opening system having a push-button remote control is marketed which is preprogrammed compatible with every door which includes a proprietary fixed receiving unit. However, the remote opening system still requires a user to depress a button or otherwise physically exerts a user to perform the door actuating and opening function.

Finally, alternative technologies that are not specifically designed for use by people with disabilities, but rather can be activated by any user, such as infrared or microwave technologies, do not solve the problem. The technologies lack compatibility with many doors, and are typically only used on sliding doors such as those seen at airports and grocery stores. In addition, systems exhibiting the infrared or microwave technologies must be mounted in very specific locations around a door, which limits the system's ability to be installed on some doors.

Thus, a need exists for an apparatus, system, and method which serve to perform a door actuating and opening function without requiring physical exertion on the part of a user. In addition, a need exists for such an apparatus and system to be cost-efficient and effective, to encourage the implementation of the systems in as many applications and settings as possible to promote universal accessibility to people with disabilities and other users who can use assistance.

SUMMARY OF THE INVENTION

In one embodiment, the present invention is an actuating mechanism for a door comprising a first antenna block having a first integrated microcontroller electrically connected to a first transceiver device and a first antenna, a second antenna block having a second integrated microcontroller electrically connected to a second transceiver device and a second antenna, and a processor device electrically connected between the first and second microcontrollers and a first switch, the first switch configured to be coupled in parallel with a second switch, wherein the first and second antennas receive a first radio frequency signal from a third mobile transceiver device, the first and second microcontrollers process the first radio frequency signal and send a control signal to the processor device, and the processor device calculates a time difference of arrival (TDOA) of the first radio frequency signal, then computes a direction of arrival (DOA) utilizing the TDOA measurement, the DOA measurement compared against a predefined range of DOAs, whereupon the processor device sends a control signal to the first switch to actuate the door in the event of a match.

In another embodiment, the present invention is a door actuating system comprising a first mobile transceiver electrically coupled to a first microcontroller and a first antenna, a second transceiver electrically coupled to a second antenna, a third transceiver electrically coupled to a third antenna, and a processing device electrically coupled between the second and third antennas and a first switch, the first switch configured to be coupled in parallel with a second switch, wherein the first mobile transceiver receives a first radio frequency signal from the second or third transceivers, the signal detected by the first microcontroller, the first microcontroller instructs the first mobile transceiver to send a second radio frequency signal which is received by the second and third transceivers, and the processing device calculates a time difference of arrival (TDOA) of the second radio frequency signal, then computes a direction of arrival (DOA) utilizing the TDOA measurement, the DOA measurement compared against a predefined range of DOAs, whereupon the processor device sends a control signal to the first switch to actuate the door in the event of a match.

In yet another embodiment, the present invention is a method of actuating a door, comprising receiving a first radio frequency signal by a first mobile transceiver device detecting the receipt of the first radio frequency signal by a first microcontroller connected to the first mobile transceiver device, instructing the first mobile transceiver to transmit a second radio frequency signal, receiving the second radio frequency signal by a second and a third transceiver device, calculating a time difference of arrival (TDOA) of the second radio frequency signal by a processing device connected to the second and third transceiver devices, calculating a direction of arrival (DOA) using the TDOA measurement by the processing device, comparing the DOA against a predefined range of DOAs by the processing device, and sending a control signal by the processing device to a first switch to actuate the door in the event of a DOA match.

In still another embodiment, the present invention is a method of manufacturing an actuating mechanism for a door, comprising providing a first antenna block having a first integrated microcontroller electrically connected to a first transceiver device and a first antenna, providing a second antenna block having a second integrated microcontroller electrically connected to a second transceiver device and a second antenna, and providing a processor device electrically connected between the first and second microcontrollers and a first switch, the first switch configured to be coupled in parallel with a second switch, wherein the first and second antennas receive a first radio frequency signal from a third mobile transceiver device, the first and second microcontrollers process the first radio frequency signal, and send a control signal to the processor device, and the processor device computes a time difference of arrival (TDOA) of the first radio frequency signal, then computes a direction of arrival (DOA) utilizing the TDOA measurement, the DOA measurement compared against a predefined range of DOAs, whereupon the processor device sends a control signal to the first switch to actuate the door in the event of a match.

DETAILED DESCRIPTION OF THE DRAWINGS

Figure 1A:
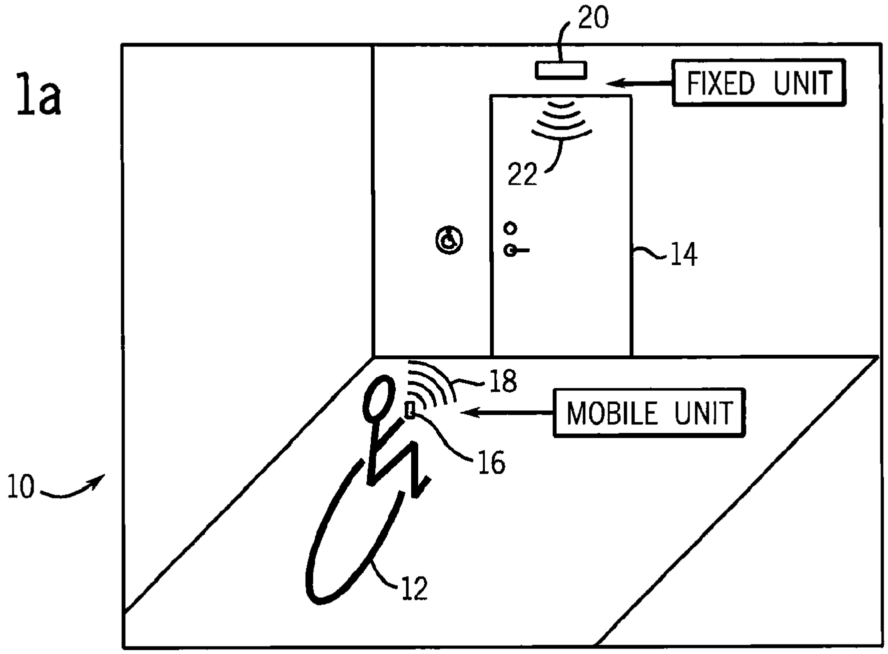
FIGS. 1*a* and 1*b* illustrate an example door actuating and opening apparatus and system during operation.

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A compact, wireless system can be utilized to actuate and open doors for persons with disabilities and/or those who otherwise have difficulty opening doors. The system includes a fixed mechanism or unit and a mobile unit, the units working together to actuate a door. FIG. 1*a* illustrates the wireless system 10 in an example operation. A person 12 with a disability approaches a door 14. A mobile unit 16 emits radio frequency signals 18 when the mobile unit 16 is within range of a door 14 equipped with a fixed unit 20. The mobile unit 16 is configured to only activate when the unit 16 is within a specified range of the door 14 to be opened and fixed unit 20. The mobile unit 16 receives signals 22 which are sent by fixed unit 20.

Figure 1B:
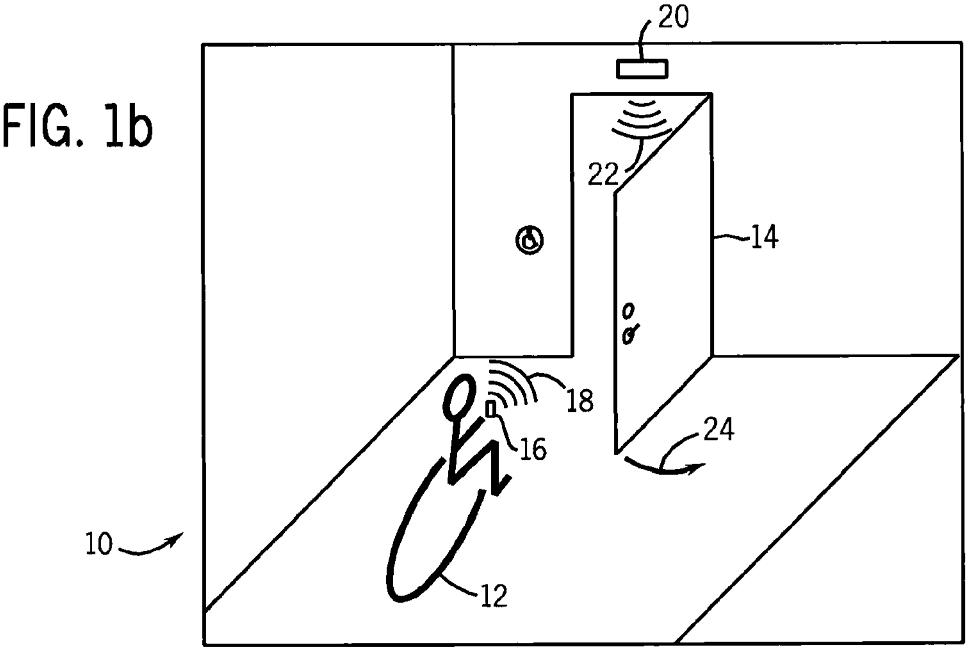

The fixed unit 20 receives a second signal 18 that is sent from the mobile unit 16, once the mobile unit 16 has received a first signal. The second signal 18 sent by mobile unit 16 can include a code which is verified by the fixed unit 20 to determine if the door 14 should be opened. As shown in FIG. 1*b*, the mobile unit 16 can be attached to a wheelchair or other device which provides accessibility to a user. In addition, mobile unit 16 can also be connected to a keychain, necklace, or other item which can be carried by a user. When the person 12 in the wheelchair becomes in close enough proximity to door 14 and fixed unit 20, the mobile unit 16 receives first radio frequency signal 22 from fixed unit 20. In response, the mobile unit 16 sends a second radio frequency signal 18 to instruct the fixed unit 20 to open the door. The Fixed unit 20 sends a control signal to an automatic door opening motor, and the door opens 24. The entire process, as depicted, is completely wireless. No physical exertion is required on the part of the user 12 to activate the system 10.

Figure 2:
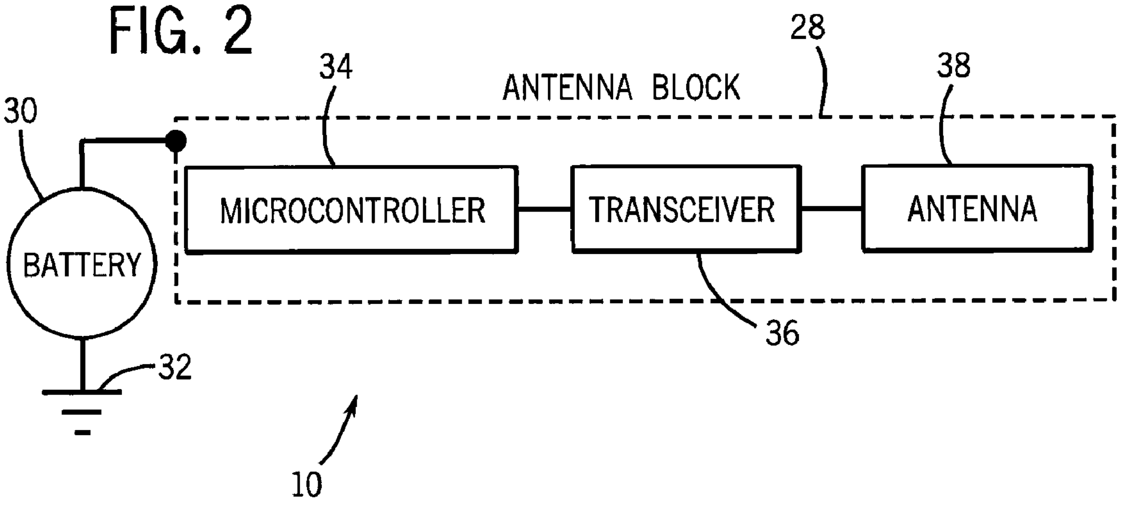
FIG. 2 illustrates a block diagram of an example mobile unit.

Turning to FIG. 2, a block diagram of a mobile unit module 16 subsystem is depicted. Mobile unit 16 includes a first antenna block 28. The antenna block includes a microcontroller 34, a transceiver device 36, and an antenna 38, each electrically connected with various signal bearing mediums as shown. A battery 30, connected to ground 32, is also coupled to block 28 to provide a remotely accessible source of power to the block 28. In one embodiment, microcontroller 34 can be programmed to continually receive radio frequency signals in a power-conservation mode. Microcontroller 34 can sift through the various signals to detect and identify a proprietary and/or unique radio frequency signal 22 emanating from a particular fixed unit 20. After the signal 22 is detected and identified, the mobile unit module 16 can transmit a second radio frequency signal 18 back to fixed unit 20.

Figure 3A:
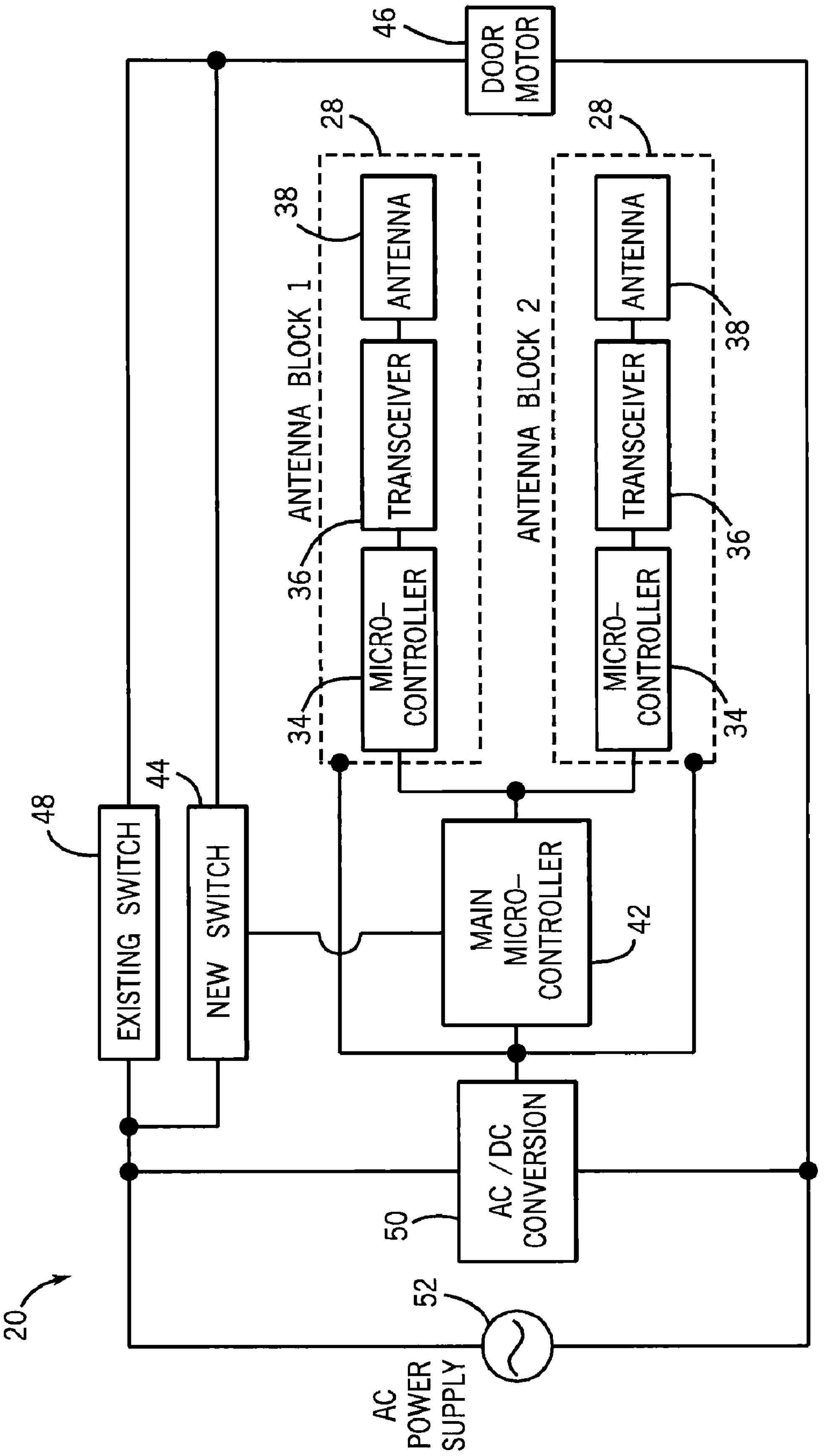
FIG. 3*a* illustrates a block diagram of an example fixed unit.

FIG. 3*a* shows a fixed unit module 20 which is configured to receive signals from above a door 14. In the embodiment shown, two antenna block modules 28, each having an integrated microcontroller 34, transceiver device 36 and antenna 38, are connected to a main microcontroller 42 or similar processor/processing device 42. Device 42 is then coupled to a new switch 44. Switch 44 actuates and/or supplies electrical power to door motor 46 which serves to actuate and open the door 14.

Figure 3B:
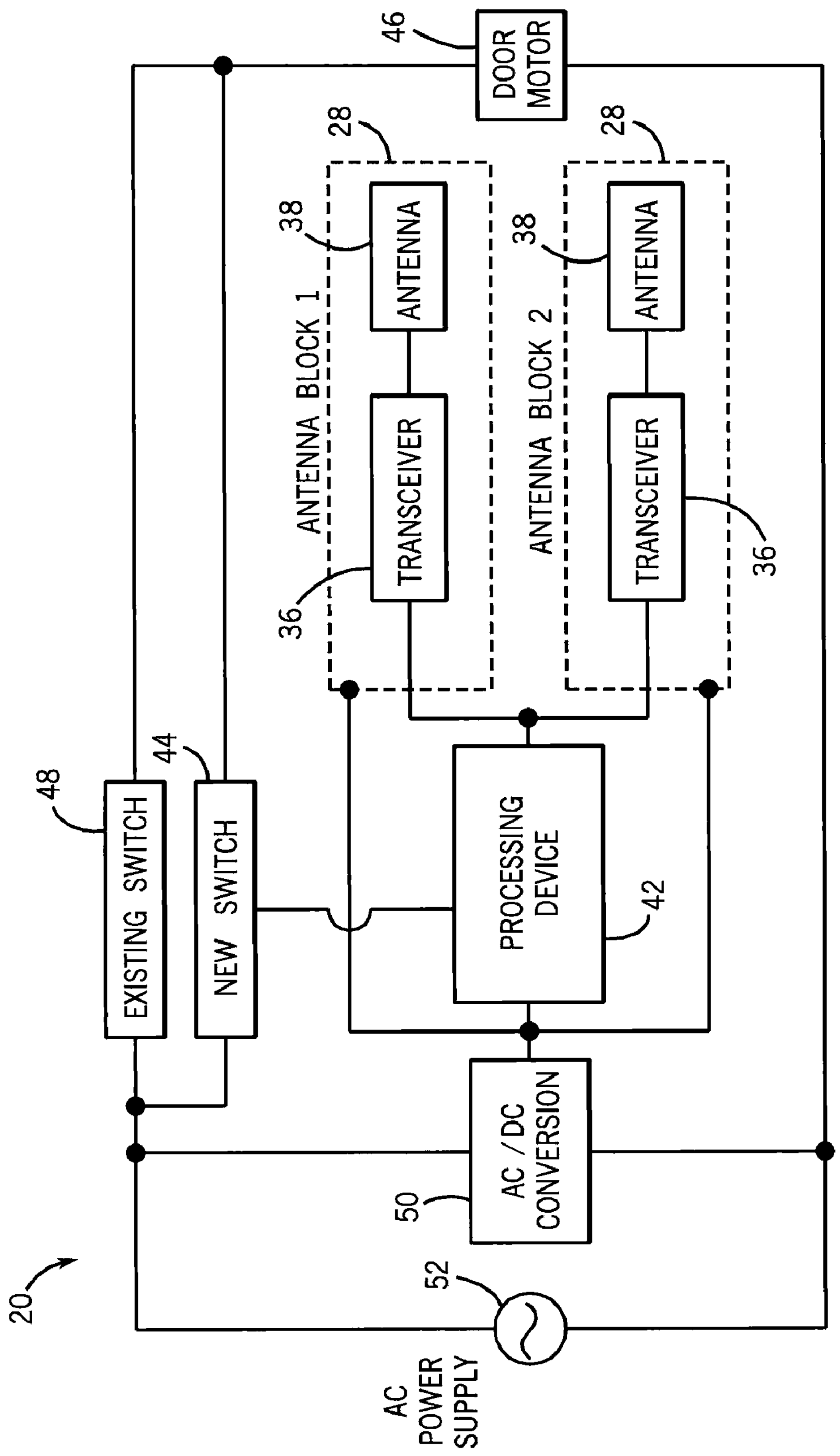
FIG. 3*b* illustrates a block diagram of an example fixed unit in a separate embodiment.

As one skilled in the art would appreciate, microcontrollers 34 can be incorporated into main microcontroller or processing device 42, such that a single processing device 42 performs the functionality described herein of receiving radio frequency signals, performing measurements and effecting calculations on the measurements. As such, a single processing device 42 can be directly connected to first and second transceivers 36 and antennas 38 as shown in FIG. 3*b*. In addition, the various electrical connections which connect the switch device 44 to door motor 46 can be low voltage in nature. A control signal can be supplied via switch device 44 to door motor 46, which can have a separate, higher voltage connection to power supply 52. In effect, switch 44 can act as a relay device 44 to turn on motor 46.

Fixed unit 20 is intended to operate alongside existing disabled-accessible equipment. As such, new switch 44 is coupled in parallel with existing switch 48, so that either switch 44 or switch 48 can independently operate to actuate and/or supply power to door motor 46, actuate and open door 14. Existing switch 48 can be integrated into such disabled-accessible devices as motion detectors, photoelectric devices, a floor mat which senses pressure to activate switch 48, or even a manual switch 48, such as the large pushbutton switches 48 which are commonly seen outside disabled-accessible restrooms and the like. Because switch 48 independently controls the operation of door motor 46 from switch 44, system 10 can effectively function without negatively impacting the manual operation of existing switch 48 for disabled persons.

Components such as antenna block modules 28 and processor device 42 are powered by an AC/DC converting block 50, which receives AC power from the same AC power supply 52 that the existing door opening switch 48 and motor 46 uses. Block 50 can include various switching power supplies which are known in the art and selected for a particular application.

Each antenna block module 28 can be mounted a specified distance away from the other antenna block module 28, depending on a particular application or embodiment. The antenna modules 28 are programmed to send a signal to device 42 when the antenna module 28 receives a wireless radio frequency signal from a mobile unit module 16. The device 42 then processes the signals the device 42 receives from each antenna block 28, and determines an angle of approach of the mobile unit module 16. The determination of the angle of approach will be further described.

Based upon the direction of approach, the device 42 makes a determination whether conditions are safe for door 14 to be opened. The determination will also be further described. If the mobile unit 16 is approaching the door 14 from an angle within a predetermined or specified range, the device 42 activates the switch 44 sending electrical power to door motor 46 to open the door 14. In another embodiment, the device 42 sends a signal over a signal bearing medium to a receiving device attached to door motor 46 to actuate and open the door.

To detect the approach of a mobile unit module 16 from either side of a door 14, the fixed unit configuration shown in FIG. 3*a* can be modified by the addition of two additional antenna block modules 28 which are positioned on either side of the door 14. The additional antenna modules 28 can have the similar electrical connections to both the AC/DC conversion block 50 and the main microcontroller processor device 42.

Figure 4A:
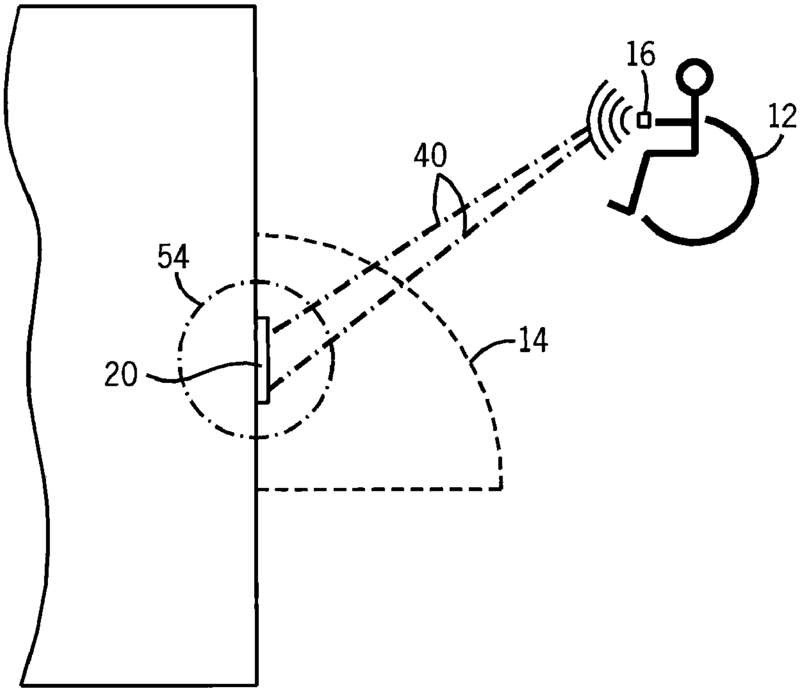
FIG. 4*a* illustrates a diagram of an example user approach angle.
Figure 4B:
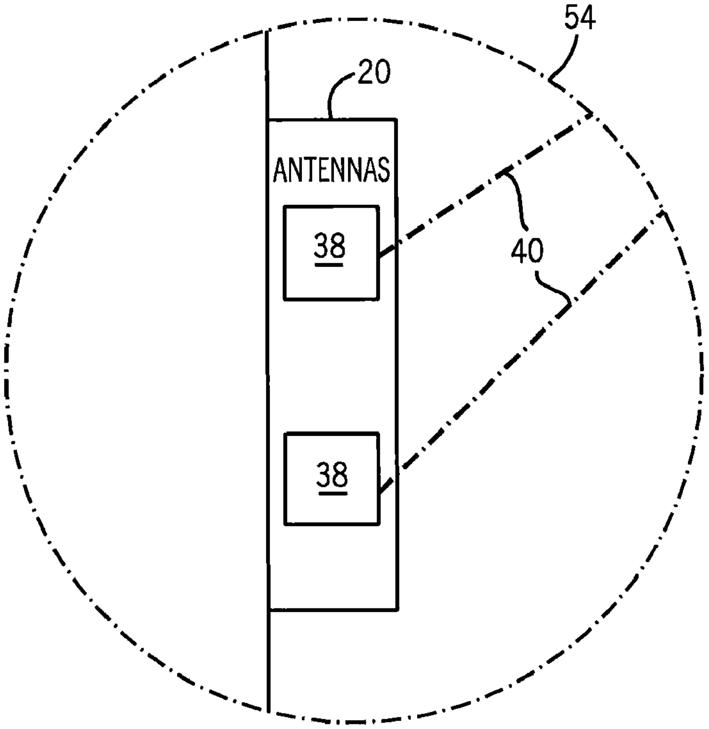
FIG. 4*b* illustrates a close-up view of a fixed unit receiving radio frequency signals to determine a user approach angle.

Turning to FIGS. 4*a* and 4*b*, an illustration of method of calculating a user approach angle, or direction of arrival (DOA) is shown. Fixed unit 20 is shown mounted above a door 14 opening. A footprint of door 14 as the door 14 opens is shown by dotted line. A user 12 with an accompanying mobile unit module 16 is shown in close enough proximity to door 14 and fixed unit 20 to receive radio frequency signals 40 at each antenna block module 28. FIG. 4*b* shows a close-up view of area 54 of FIG. 4*a*. Here, the individual antennas 38 (first and second) are seen, each receiving radio frequency signal 40.

Radio frequency signal 40 is sent by a mobile unit module 16 at a fixed time. However, signals 40 arrive at the first and second antennas 38 at slightly different times. The fixed unit module 20 determines the angle that a user 12 is approaching a door 14 by measuring the time delay between when each fixed unit antenna 38 receives a signal 40 from the mobile unit module 16.

Microcontrollers 34, and/or processor device 42 can include an integrated digital signal processor (DSP) device which measures the time delays from each antenna 38 element. Device(s) 34, 42 can compute the direction of arrival (DOA), as well as adjust excitations of the radio frequency signals (gains and phases of the signals) to produce a radiation pattern that focuses on the signal of interest (SOI) while tuning out any signal-not-of-interest (SNOI).

The time difference of the signal arriving at the two antenna 38 elements can be written as $$\Delta t=(t_1-t_2)=\Delta d/v_0=d\cos(\theta)/v_0 \quad (1)$$

where $v_0$ is the speed of light in free-space. This equation can be rewritten as $$\cos(\theta)=v_0/d\,\Delta t=v_0/d(t_1-t_2) \quad (2)$$

or $$(\theta)=\cos^{-1}(v_0/d\,\Delta t)=\cos^{-1}[v_0/d(t_1-t_2)]. \quad (3)$$

As a result, the angle of incidence θ (DOA) can be determined by ascertaining the time delay between the two elements $\Delta t=(t_1-t_2)$, and the geometry of the antenna array consisting of a linear array of two antenna 38 elements with a spacing d between the elements.

Figure 5:
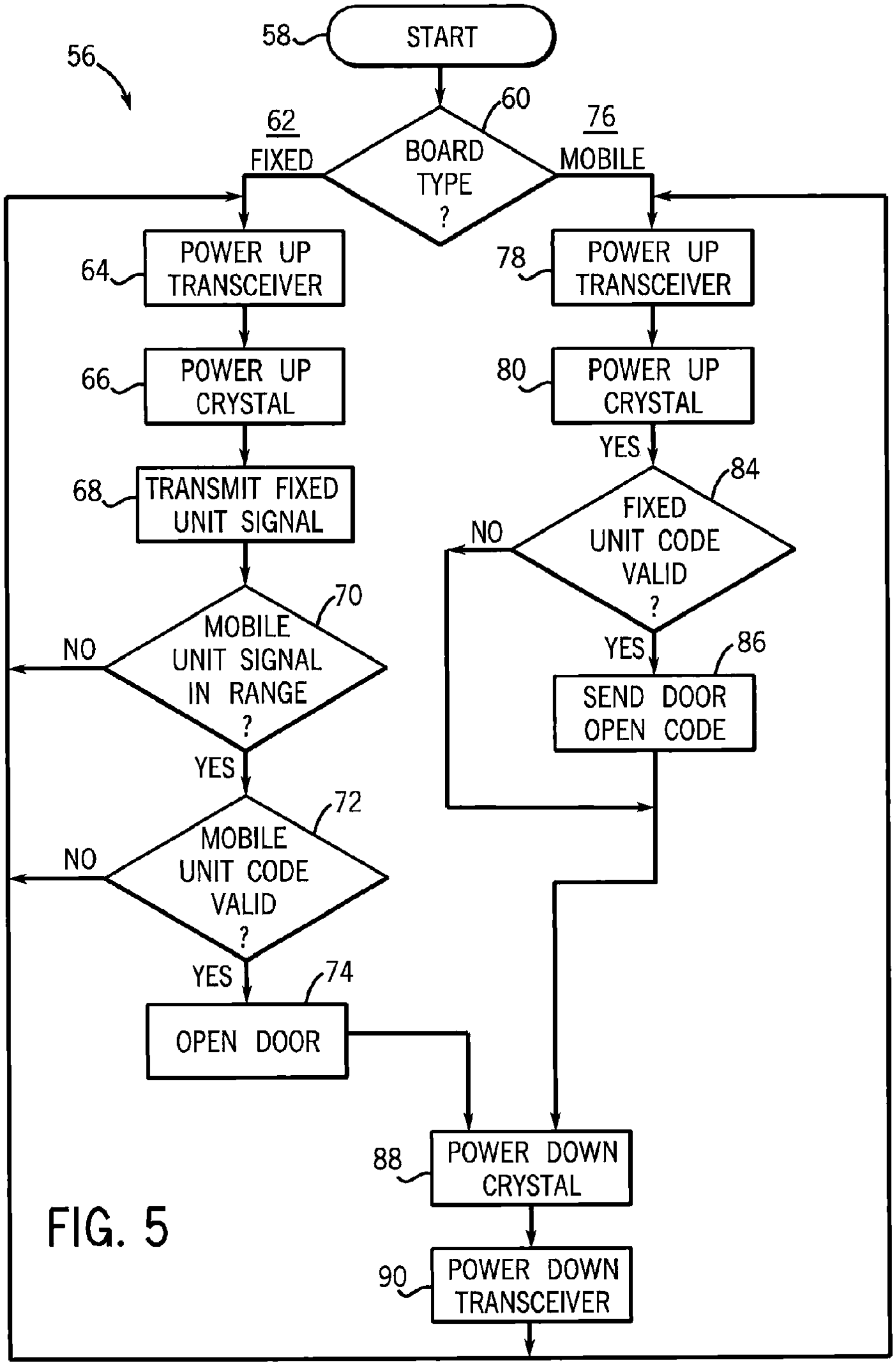
FIG. 5 illustrates a logical flow-chart diagram of an example operation of the door actuating and opening system.

Turning to FIG. 5, a logical flow chart diagram of an example operation 56 of system 10 is depicted. Operation 56 includes an example verification process for determining that a radio frequency signal 40 is valid to open door 14. Operation 56 begins (step 58) and the logic diverges based on whether the antenna block module 28 is a fixed or mobile unit (step 60). If fixed (step 62), microcontroller 34 powers up the transceiver 36 (step 64) and an embedded crystal oscillator (step 66). The fixed unit 20 transmits a fixed unit signal which is received by a mobile unit 16 (step 68). If the fixed unit 20 is in range of a transmitted mobile unit signal (step 70), and the mobile unit code transmitted in the signal is determined to be valid (step 72), then microcontroller 42 sends a control signal to switch 44 to open the door 14 (step 74). The fixed unit 20 then powers down the crystal oscillator (step 88) and transceiver (step 90).

Returning to step 60, if the board type is mobile (step 76), microcontroller 34 embedded in the mobile unit 16 also powers up the mobile transceiver 36 (step 78) as well as the embedded crystal oscillator (step 80). If the mobile unit 16 determines that the fixed unit code transmitted in the signal is valid (step 84), then microcontroller 34 instructs transceiver 36 in mobile unit 16 to send a door open code to the fixed unit 20 (step 86). The mobile unit 16 then powers down the crystal oscillator (again, step 88) and transceiver (again, step 90).

Figure 6:
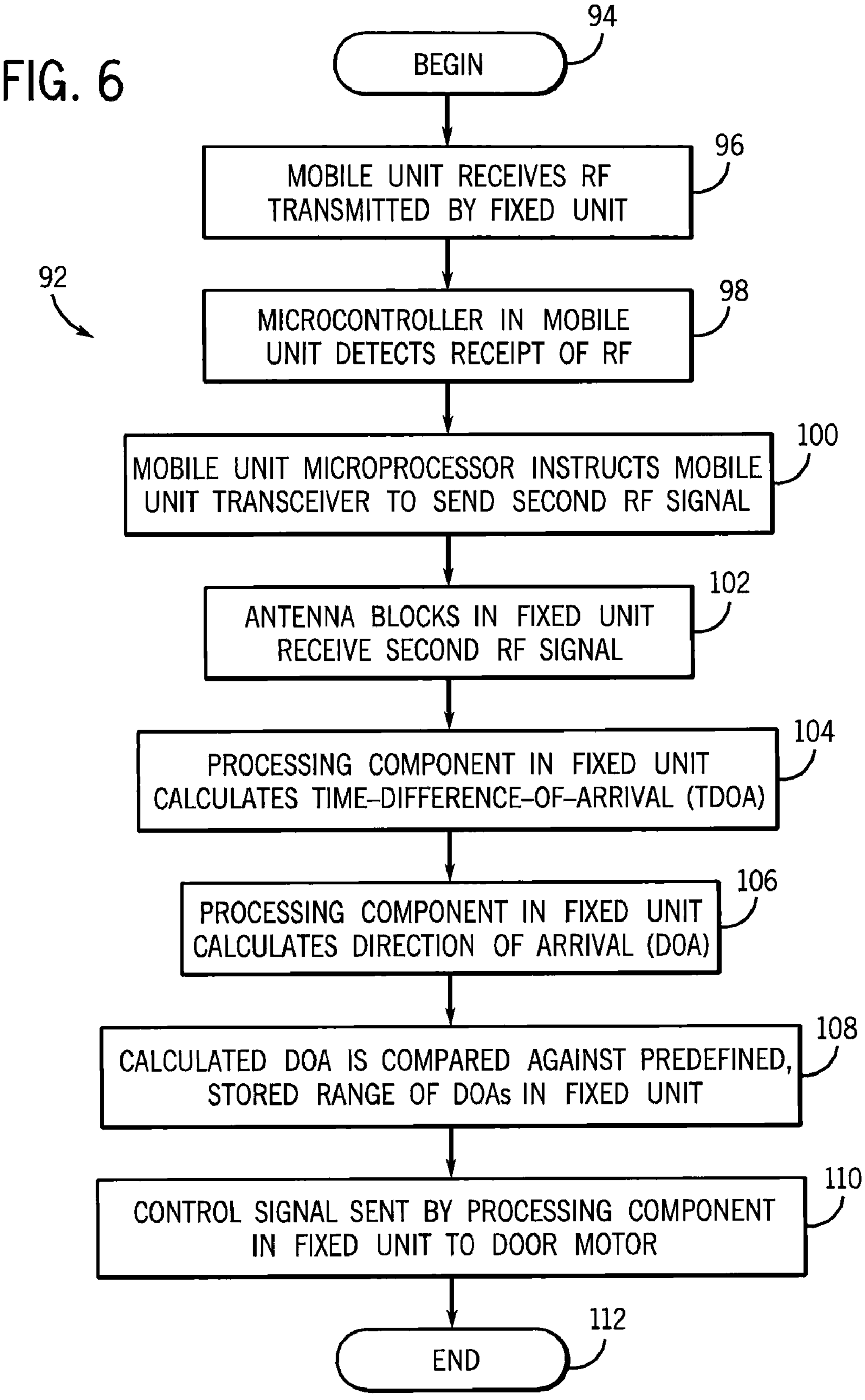
FIG. 6 illustrates an example operation of the door actuating and opening system in a flow-chart diagram.

FIG. 6 illustrates an example method 92 of operation to actuate and open a door in accordance with the present invention. As previously described, a fixed unit module 20 operates, in one embodiment, to continually transmit a radio frequency signal which is received by a mobile unit 16. Method 92 begins (step 94) with the mobile unit 16 receiving the RF transmission by the fixed unit 20 (step 96). In one example, the mobile unit 16 can utilize a circuit which causes the mobile unit 16 to operate in a low-power consuming state yet capable of receiving radio frequency transmissions. Once the mobile unit 16 receives a radio frequency transmission of the appropriate specification, the circuit may cause the mobile unit 16 to awake, powering the transceiver 36 and associated subcomponents of antenna block module 28. In another embodiment, the mobile unit 16 can use an entirely separate system to receive appropriate radio frequency transmissions to indicate that the mobile unit 16 is in close proximity to a remote door actuator and opener and to power on appropriate components of the mobile unit 16 in response.

Whether the mobile unit 16 utilizes a separate circuit, a separate system or otherwise, the microcontroller 34 in the mobile unit 16 detects the receipt of the radio frequency (step 98). In response, the mobile unit 16 directs the transceiver 36 integrated into mobile unit 16 to send a second radio frequency signal (step 100). The second radio frequency signal can include a mobile unit code or other specialized information which is verified by the fixed unit 20 (see, e.g., FIG. 5, steps 72, 86) for security purposes or otherwise. Once the second signal is transmitted, the respective antenna blocks 28 in fixed unit 20 receive the signal (step 102). As previously described, the signal is received by a first and second antenna 38 integrated into fixed unit 20 at different times. Microcontrollers 34 integrated into fixed unit 20 receive and process the second signal, and send a control signal to the processing component 42 where time-difference-of-arrival (TDOA) measurements of the received second signal are calculated (step 104).

As a next step, the processing component 42 analyzes the TDOA measurements to calculate the direction of arrival (DOA) of the user (step 106). The calculated DOA is compared against a predefined, stored range of DOAs in the fixed unit or elsewhere (step 108). If a match is obtained, a control signal is sent by the processing component 42 to switch 44 and thereby to door motor 46 to open the door (step 110). The method 92 then ends (step 112).

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for automatically actuating a door, comprising:

a building structure including a door;

a door motor coupled to the door for actuating the door;

a fixed transceiver unit coupled to the building structure, the fixed transceiver unit including, (a) a first microprocessor, (b) a first transceiver coupled to the first microprocessor for processing a first radio frequency (RF) signal and third RF signal, (c) a second transceiver coupled to the first microprocessor for processing a second RF signal and third RF signal, (d) a first antenna coupled to the first transceiver for transmitting the first RF signal and receiving the third RF signal, the first antenna being located proximate to a first side of the door, and (e) a second antenna coupled to the second transceiver for transmitting the second RF signal and receiving the third RF signal, the second antenna being located proximate to a second side of the door, opposite the first side of the door;

a first electrical switch operating in response to the first microprocessor for controlling the door motor to actuate the door;

a wheelchair; and a mobile transceiver unit mounted to the wheelchair, the mobile transceiver unit including, (f) a second microprocessor, (g) a third transceiver coupled to the second microprocessor for processing the first, second, and third RF signals, (h) a third antenna coupled to the third transceiver for transmitting the third RF signal and receiving the first and second RF signals, and (i) a battery for providing operating power to the second microprocessor and third transceiver;

wherein:

the third antenna receives the first and second RF signals from the first and second antenna, the third transceiver and second microprocessor process the first and second RF signals to generate a door activation code, the third antenna transmits the third RF signal containing the door activation code to the first and second antenna when the wheelchair is within a predefined range of the door to automatically actuate the door without physical action by an occupant of the wheelchair, the first and second antenna receive the third RF signal containing the door activation code, the first and second transceivers and first microprocessor process the third RF signal containing the door activation code to determine authorization to actuate the door based on the door activation code, the first microprocessor further processes the third RF signal to determine a time difference of arrival (TDOA) of the third RF signal incident to the first and second antenna, the third RF signal being received by the first antenna at a first time and received by the second antenna at a second time, the second time being different from the first time, the TDOA being determined from a difference between the first time and second time, the first microprocessor computes a direction of arrival (DOA) of the wheelchair as $\cos^{-1}[(v_0/d)\Delta t]$, where $v_0$ is speed of light, d is distance between the first and second antenna, and $\Delta t$ is the difference between the first time and second time, the DOA is compared against a predefined range of stored DOAs to confirm the wheelchair is outside a door footprint area during actuation of the door, and the first microprocessor actuates the door upon confirming the door activation code and confirming the wheelchair is outside the door footprint area.

2. The system of claim 1, further including a second electrical switch for controlling the door motor to actuate the door in response to a manual operation, motion detector, photoelectric device, or pressure sensor independent of the first electrical switch.

3. The system of claim 1, wherein prior to receiving the first and second RF signals the second microprocessor and third transceiver operate in a power conservation mode which provides for reception of the first and second RF signals.

4. The system of claim 1, wherein the first microprocessor adjusts the DOA for gain and phase variation of the third RF signal.

5. A system for automatically actuating a door, comprising:

a fixed transceiver unit including, (a) a first microprocessor, (b) a first transceiver coupled to the first microprocessor for processing a first radio frequency (RF) signal and third RF signal, (c) a second transceiver coupled to the first microprocessor for processing a second RF signal and third RF signal, (d) a first antenna coupled to the first transceiver for transmitting the first RF signal and receiving the third RF signal, the first antenna being located proximate to a first side of the door, and (e) a second antenna coupled to the second transceiver for transmitting the second RF signal and receiving the third RF signal, the second antenna being located proximate to a second side of the door, opposite the first side of the door;

a first electrical switch operating in response to the first microprocessor for actuating the door;

a wheelchair; and a mobile transceiver unit located in proximity to the wheelchair and in wireless communication with the fixed transceiver unit, the mobile transceiver unit including, (f) a second microprocessor, (g) a third transceiver coupled to the second microprocessor for processing the first, second, and third RF signals, (h) a third antenna coupled to the third transceiver for transmitting the third RF signal and receiving the first and second RF signals, and (i) a battery for providing operating power to the second microprocessor and third transceiver;

wherein:

the third antenna receives the first and second RF signals from the first and second antenna, the third transceiver and second microprocessor process the first and second RF signals to generate a door activation code, the third antenna transmits the third RF signal containing the door activation code to the first and second antenna to automatically actuate the door, the first and second antenna receive the third RF signal containing the door activation code, the first and second transceivers and first microprocessor process the third RF signal containing the door activation code to determine authorization to actuate the door based on the door activation code, the first microprocessor further processes the third RF signal to determine a time difference of arrival (TDOA) of the third RF signal incident to the first and second antenna, the third RF signal being received by the first antenna at a first time and received by the second antenna at a second time, the TDOA being determined from a difference between the first time and second time, the first microprocessor computes a direction of arrival (DOA) of the wheelchair as $\cos^{-1}[(v_0/d)\Delta t]$, where $v_0$ is speed of light, d is distance between the first and second antenna, and $\Delta t$ is the difference between the first time and second time, the DOA is compared against a predefined range of stored DOAs to confirm the wheelchair is outside a door footprint area during actuation of the door, and the first microprocessor actuates the door upon confirming the door activation code and confirming the wheelchair is outside the door footprint area.

6. The system of claim 5, further including a second electrical switch for actuating the door in response to a manual operation, motion detector, photoelectric device, or pressure sensor independent of the first electrical switch.

7. The system of claim 5, wherein prior to receiving the first and second RF signals the second microprocessor and third transceiver operate in a power conservation mode which provides for reception of the first and second RF signals.

8. The system of claim 5, wherein the first microprocessor adjusts the DOA for gain and phase variation of the third RF signal.

9. The system of claim 5, wherein the mobile transceiver unit is carried by an occupant in the wheelchair.

10. The system of claim 5, wherein the third antenna transmits the third RF signal containing the door activation code to the first and second antenna when the wheelchair is within a predefined range of the door to automatically actuate the door without physical action by an occupant of the wheelchair.

11. A system for automatically actuating a door, comprising:

a fixed transceiver unit including, (a) a first microprocessor, (b) a first transceiver coupled to the first microprocessor for processing a first radio frequency (RF) signal and third RF signal, (c) a second transceiver coupled to the first microprocessor for processing a second RF signal and third RF signal, (d) a first antenna coupled to the first transceiver for transmitting the first RF signal and receiving the third RF signal, the first antenna being located proximate to a first side of the door, and (e) a second antenna coupled to the second transceiver for transmitting the second RF signal and receiving the third RF signal, the second antenna being located proximate to a second side of the door, opposite the first side of the door;

a first electrical switch operating in response to the first microprocessor for actuating the door;

a wheelchair; and a mobile transceiver unit located in proximity to the wheelchair and in wireless communication with the fixed transceiver unit, the mobile transceiver unit including, (f) a second microprocessor, (g) a third transceiver coupled to the second microprocessor for processing the first, second, and third RF signals, (h) a third antenna coupled to the third transceiver for transmitting the third RF signal and receiving the first and second RF signals, and (i) a battery for providing operating power to the second microprocessor and third transceiver;

wherein:

the third antenna receives the first and second RF signals from the first and second antenna, the third transceiver and second microprocessor process the first and second RF signals to generate a door activation code, the third antenna transmits the third RF signal containing the door activation code to the first and second antenna to automatically actuate the door, the first and second antenna receive the third RF signal containing the door activation code, the first and second transceivers and first microprocessor process the third RF signal containing the door activation code to determine authorization to actuate the door based on the door activation code, the first microprocessor further processes the third RF signal to determine a time difference of arrival (TDOA) of the third RF signal incident to the first and second antenna, the first microprocessor computes a direction of arrival (DOA) of the wheelchair based on the TDOA and comparing the DOA against a predefined range of stored DOAs to confirm the wheelchair is outside a door footprint area during actuation of the door, and the first microprocessor actuates the door upon confirming the door activation code and confirming the wheelchair is outside the door footprint area.

12. The system of claim 11, wherein the third RF signal is received by the first antenna at a first time and received by the second antenna at a second time and the TDOA is determined from a difference between the first time and second time.

13. The system of claim 12, wherein the first microprocessor computes a direction of arrival (DOA) of the wheelchair as $\cos^{-1}[(v_0/d)\Delta t]$, where $v_0$ is speed of light, d is distance between the first and second antenna, and $\Delta t$ is the difference between the first time and second time.

14. The system of claim 11, wherein the first microprocessor adjusts the DOA for gain and phase variation of the third RF signal.

15. The system of claim 11, further including a second electrical switch for actuating the door in response to a manual operation, motion detector, photoelectric device, or pressure sensor independent of the first electrical switch.

16. The system of claim 11, wherein prior to receiving the first and second RF signals the second microprocessor and third transceiver operate in a power conservation mode which provides for reception of the first and second RF signals.

17. The system of claim 11, wherein the third antenna transmits the third RF signal containing the door activation code to the first and second antenna when the wheelchair is within a predefined range of the door to automatically actuate the door without physical action by an occupant of the wheelchair.

18. A method of automatically actuating a door, comprising:

providing a fixed transceiver unit including, (a) a first microprocessor, (b) a first transceiver coupled to the first microprocessor for processing a first radio frequency (RF) signal and third RF signal, (c) a second transceiver coupled to the first microprocessor for processing a second RF signal and third RF signal, (d) a first antenna coupled to the first transceiver for transmitting the first RF signal and receiving the third RF signal, the first antenna being located proximate to a first side of the door, and (e) a second antenna coupled to the second transceiver for transmitting the second RF signal and receiving the third RF signal, the second antenna being located proximate to a second side of the door, opposite the first side of the door;

providing a first electrical switch operating in response to the first microprocessor for actuating the door;

providing a wheelchair; and providing a mobile transceiver unit located proximate to the wheelchair and in wireless communication with the fixed transceiver unit, the mobile transceiver unit including, (f) a second microprocessor, (g) a third transceiver coupled to the second microprocessor for processing the first, second, and third RF signals, (h) a third antenna coupled to the third transceiver for transmitting the third RF signal and receiving the first and second RF signals, and (i) a battery for providing operating power to the second microprocessor and third transceiver;

wherein:

the third antenna receives the first and second RF signals from the first and second antenna, the third transceiver and second microprocessor process the first and second RF signals to generate a door activation code, the third antenna transmits the third RF signal containing the door activation code to the first and second antenna to automatically actuate the door, the first and second antenna receive the third RF signal containing the door activation code, the first and second transceivers and first microprocessor process the third RF signal containing the door activation code to determine authorization to actuate the door based on the door activation code, the first microprocessor further processes the third RF signal to determine a time difference of arrival (TDOA) of the third RF signal incident to the first and second antenna, the first microprocessor computes a direction of arrival (DOA) of the wheelchair based on the TDOA and comparing the DOA against a predefined range of stored DOAs to confirm the wheelchair is outside a door footprint area during actuation of the door, and the first microprocessor actuates the door upon confirming the door activation code and confirming the wheelchair is outside the door footprint area.

19. The method of claim 18, wherein the third RF signal is received by the first antenna at a first time and received by the second antenna at a second time and the TDOA is determined from a difference between the first time and second time.

20. The method of claim 19, wherein the first microprocessor computes a direction of arrival (DOA) of the wheelchair as $\cos^{-1}[(v_0/d)\Delta t]$, where $v_0$ is speed of light, d is distance between the first and second antenna, and $\Delta t$ is the difference between the first time and second time.

21. The method of claim 18, wherein the first microprocessor adjusts the DOA for gain and phase variation of the third RF signal.

22. The method of claim 18, further including a second electrical switch for actuating the door in response to a manual operation, motion detector, photoelectric device, or pressure sensor independent of the first electrical switch.

23. The method of claim 18, wherein prior to receiving the first and second RF signals the second microprocessor and third transceiver operate in a power conservation mode which provides for reception of the first and second RF signals.

24. The method of claim 18, wherein the third antenna transmits the third RF signal containing the door activation code to the first and second antenna when the wheelchair is within a predefined range of the door to automatically actuate the door without physical action by an occupant of the wheelchair.

* * * * *